US012618733B2

(12) United States Patent
Lowry et al.

(10) Patent No.: US 12,618,733 B2
(45) Date of Patent: May 5, 2026

(54) TENSION MONITORING APPARATUS INCLUDING A FIXING WITH A SHANK UNDER TENSION AND A STRAIN SENSOR EMBEDDED IN THE SHANK WHERE THE STRAIN SENSOR IS CONNECTED TO A DATA PROCESSING MEANS

(71) Applicant: Copper State Bolt & Nut Company, Inc., Phoenix, AZ (US)

(72) Inventors: Steve Lowry, Cramlington (GB);
Tomasz Rosinski, Cramlington (GB);
Krzysztof Rosinski, Cramlington (GB);
Jarek Rosinski, Cramlington (GB)

(73) Assignee: Copper State Bolt & Nut Company, Inc.

( * ) Notice: Subject to any disclaimer, the term of this patent is extended or adjusted under 35 U.S.C. 154(b) by 270 days.

(21) Appl. No.: 18/278,346

(22) PCT Filed: Feb. 18, 2022

(86) PCT No.: PCT/GB2022/050457
§ 371 (c)(1),
(2) Date: Aug. 22, 2023

(87) PCT Pub. No.: WO2022/180374
PCT Pub. Date: Sep. 1, 2022

(65) Prior Publication Data
US 2024/0142327 A1 May 2, 2024

(30) Foreign Application Priority Data
Feb. 23, 2021 (GB) ...................................... 2102554

(51) Int. Cl.
*G01L 5/24* (2006.01)
*B08B 3/00* (2006.01)
*B62J 50/16* (2020.01)

(52) U.S. Cl.
CPC .................. *G01L 5/24* (2013.01); *B08B 3/00* (2013.01); *B62J 50/16* (2020.02); *B08B 2230/01* (2013.01)

(58) Field of Classification Search
None
See application file for complete search history.

(56) References Cited

U.S. PATENT DOCUMENTS 5,339,696 A     8/1994   Carignan
6,204,771 B1 *  3/2001   Ceney ..................... G01L 5/243
                                                      336/200

(Continued)

FOREIGN PATENT DOCUMENTS

CN       202991775 U      6/2013
CN       104791360 A      7/2015

(Continued)

OTHER PUBLICATIONS

Search Report in GB Application No. GB2102554.9 dated Aug. 23, 2021, 11 pages.

(Continued)

*Primary Examiner* — Peter J Macchiarolo
*Assistant Examiner* — Jermaine L Jenkins
(74) *Attorney, Agent, or Firm* — Barclay Damon LLP; Daniel McGrath

(57) ABSTRACT

Disclosed herein is a tension monitoring apparatus. The apparatus comprises a fixing with a shank which in use is under tension, a strain sensor embedded in the shank of the fixing and configured to generate a strain sensor signal corresponding to tension in the shank. The apparatus further comprises a data processing means configured to receive the strain sensor signal, process the strain sensor signal in accordance with one or more characterising parameters associated with the strain sensor and thereby generate cor- (Continued)

responding strain sensor data indicative of a strain to which the shank is subject. Additionally, the apparatus comprises a wireless transmitter for communicating the strain sensor data to a remote receiver, wherein the data processing means and the wireless transmitter are mounted in a module fixed to an end of the fixing.

26 Claims, 8 Drawing Sheets

(56)                    References Cited

U.S. PATENT DOCUMENTS

| | | | | |
|---|---|---|---|---|
| 8,024,980 | B2 * | 9/2011 | Arms | G01L 5/1627 |
| | | | | 73/761 |
| 9,026,379 | B2 * | 5/2015 | Chu | G01L 5/24 |
| | | | | 702/41 |
| 10,316,881 | B2 * | 6/2019 | Brown | C21D 9/0093 |

| | | | |
|---|---|---|---|
| 2009/0210173 | A1 | 8/2009 | Arms et al. |
| 2011/0158806 | A1 | 6/2011 | Arms et al. |
| 2018/0252255 | A1 | 9/2018 | Fondriest et al. |
| 2020/0208672 | A1 | 7/2020 | Waxman |

FOREIGN PATENT DOCUMENTS

| | | | | | |
|---|---|---|---|---|---|
| CN | 107339309 | A | * | 11/2017 | ............... G01L 5/24 |
| CN | 109632006 | A | | 4/2019 | |
| CN | 109738106 | A | | 5/2019 | |
| DE | 102016215083 | A | | 2/2018 | |
| DE | 102016215083 | A1 | * | 2/2018 | ............... G01L 5/24 |
| WO | 2009008133 | A1 | | 1/2009 | |

OTHER PUBLICATIONS

Examination report issued on corresponding Chilean Application No. 20230249 dated Jan. 24, 2025 (1 page) (Spanish only).

* cited by examiner

101

103

102

104

<u>201</u>

206

202

101

204

102

201

205

203a

203b

601

DATA PROCESSOR — 602

HALL EFFECT SENSOR — 603

ACCELEROMETER — 604

TEMPERATURE SENSOR — 605

MEMORY — 606

TENSION MONITORING APPARATUS INCLUDING A FIXING WITH A SHANK UNDER TENSION AND A STRAIN SENSOR EMBEDDED IN THE SHANK WHERE THE STRAIN SENSOR IS CONNECTED TO A DATA PROCESSING MEANS

CROSS REFERENCE TO RELATED APPLICATIONS

This is a national stage application filed under 37 U.S.C. 371 based on International Patent Application No. PCT/GB2022/050457, filed on Feb. 18, 2022, and entitled "TENSION MONITORING APPARATUS", which claims priority to United Kingdom Application No. 2102554.9, filed on Feb. 23, 2021, entitled "TENSION MONITORING APPARATUS", the contents of which are incorporated herein by reference in their entirety for all purposes.

TECHNICAL FIELD

The present invention relates to tension monitoring apparatus, in particular tension monitoring apparatus comprising a fixing, such as a threaded bolt or stud, and including a strain sensor.

BACKGROUND

In many industrial applications threaded fixings are used as a means to fix components together. A typical threaded fixing is a bolt. Such a fixing arrangement comprises a head fixed to a threaded shank and a corresponding nut. Other examples include threaded studs comprising a threaded shank and two or more corresponding bolts.

Two or more components to be secured together are each provided with a suitable shank receiving aperture through which the shank is inserted. For bolt fixings, the nut is then screwed onto the distal end of the shank and the head of the bolt and the nut are rotated in opposite directions relative to each other to generate a securing force which secures together the components through which the shank of the bolt is inserted. Similarly, for stud fixings, the threaded shank is positioned and then two or more bolts are positioned either side of the element or elements to be fixed and rotated in opposite directions to generate the securing force.

In certain settings, for example where large bolts or studs are used to secure together structurally critical components, it is critical that fixings do not become loose.

Techniques for monitoring the securing force generated by a bolt arrangement include monitoring the tension applied to the shank of the bolt which is directly related to the securing force provided by the bolt arrangement.

In one monitoring arrangement, an ultrasonic transducer is positioned at the head of a bolt and the "time of flight" of acoustic pulses from the ultrasonic transducer is used to monitor a length of the shank of the bolt and thereby infer information about the tension applied to the shank of the bolt.

In another monitoring arrangement, a mechanical load monitoring arrangement, comprising a rod, is inserted down the length of the bolt and a gauge provided in the head of the bolt which provides a visual indication of the tension applied to the bolt shank.

Such techniques are comparatively complicated to implement and require careful and time-consuming calibration if they are to be implemented accurately.

It is an aim of embodiments of the invention to address these drawbacks.

SUMMARY OF THE INVENTION

In accordance with a first aspect of the invention, there is provided a tension monitoring apparatus. The tension monitoring apparatus comprises a fixing with a shank which in use is under tension; a strain sensor embedded in the shank of the fixing and configured to generate a strain sensor signal corresponding to tension in the shank; data processing means configured to receive the strain sensor signal, process the strain sensor signal in accordance with one or more characterising parameters associated with the strain sensor and thereby generate corresponding strain sensor data indicative of a strain to which the shank is subject, and a wireless transmitter for communicating the strain sensor data to a remote receiver, wherein the data processing means and the wireless transmitter are mounted in a module fixed to an end of the fixing.

Optionally, the shank is a threaded shank.

Optionally, the fixing is a bolt said bolt comprising a bolt head located at an end of the threaded shank.

Optionally, the module is incorporated in the head of the bolt.

Optionally, the module further comprises an interconnect for connecting the strain sensor and the data processing means, wherein the interconnect comprises memory having stored thereon one or more of the characterising parameters, said characterising parameters retrievable by the data processing means for use when generating the strain sensor data.

Optionally, the module comprises a press fit insert fixed in a corresponding insert receiving aperture at a proximal end of the fixing, said module comprising a cap enclosing the data processing means and wireless transmitter, said cap removably attached to the press fit insert.

Optionally, the cap is removably attached to the press fit insert by virtue of an intermediate adaptor secured to the press fit insert, said intermediate adaptor comprising an outer threaded face configured to engage with a corresponding inner threaded face of the cap.

Optionally, the interconnect is fixed to the press fit insert.

Optionally, the tension monitoring apparatus comprises a plurality of components that are detachable from the module by removing the cap, said plurality of components comprising the data processing means and the wireless transmitter.

Optionally, the plurality of components that are detachable from the module further comprise a battery.

Optionally, the interconnect is provided on a first circuit board arrangement and the data processing means is located on a second circuit board arrangement.

Optionally, the second circuit board arrangement comprises an upper board and a lower board and the battery is enclosed between the upper board and the lower board.

Optionally, the interconnect and the data processing means are connectable via an interface, said interface comprising a first interface part and a second interface part, wherein said first interface part comprises a plurality of pins and said second interface part comprises a plurality of substantially circular conducting tracks. The plurality of pins are positioned on the first interface part such that when the first interface part and second interface part are concentrically aligned, each pin contacts one of the plurality of substantially circular conducting tracks irrespective a rotational alignment of the first interface part and second interface part.

Optionally, the characterising parameters comprise calibration data determined during a calibration process performed on the sensor and for mapping strain sensor signal output values with sensor measurement values.

Optionally, the calibration data is data indicative of a strain sensor signal value corresponding to a zero-measurement value.

Optionally, the characterising parameters comprise identity data identifying the tension monitoring apparatus and for including in the strain sensor data transmittable to the remote receiver.

Optionally, the interconnect comprises a gain amplifier for applying a predetermined gain to the strain sensor signal before it is received by the data processing means.

Optionally, the strain sensor is located at a distal end of an axial bore extending part way down a length of the shank of the fixing.

Optionally, the tension monitoring apparatus further comprises temperature sensing means, said temperature sensing means configured to generate a temperature sensor signal indicative of a detected temperature. The data processing means is configured to receive the temperature sensor signal, process the temperature sensor signal and generate corresponding temperature sensor data. The wireless transmitter is configured to communicate the temperature sensor data to the remote receiver.

Optionally, the tension monitoring apparatus further comprises acceleration detecting means, said acceleration detecting means configured to generate an acceleration sensor signal indicative of a detected acceleration to which the apparatus is subject. The data processing means is configured to receive the acceleration sensor signal, process the acceleration sensor signal and generate corresponding acceleration sensor data. The wireless transmitter is configured to communicate the acceleration sensor data to the remote receiver.

Optionally, the tension monitoring apparatus further comprises magnetic field detecting means, said magnetic field detecting means configured to generate a magnetic field sensor signal indicative of a detected change in magnetic field. The data processing means is configured to receive the magnetic field sensor signal, process the magnetic field sensor signal and if the magnetic field sensor signal is indicative of a tightening tool being applied to the fixing, said data processing means is configured to activate the strain sensor, receive the strain sensor signal and generate strain sensor data for communicating to the remote receiver.

Optionally, the data processing means is configured to determine from the strain sensor signal a maximum and minimum detected tension in the shank, and store corresponding maximum and minimum detected tension values in a memory for subsequent communication to the remote receiver.

In accordance with a second aspect of the invention, there is provided a tension monitoring system comprising a tension monitoring apparatus according to the first aspect of the invention, a remote receiver and a remote computing system on which is running sensor data monitoring software, wherein said tension monitoring apparatus is configured to communicate the strain sensor data to the remote computing system, via the remote receiver, for processing by the sensor data monitoring software.

In accordance with aspects of the invention, a tension monitoring apparatus which comprises an otherwise conventional fixing that includes a shank that is in tension in use, such as a bolt, is provided. A strain sensor is embedded in a shank of the fixing and a module fitted to an end of the fixing (for example in the head of the bolt). The module comprises data processing means for processing sensor signals from the sensor and for generating corresponding sensor data which is then communicated to a remote receiver enabling remote monitoring to be undertaken.

Advantageously, the apparatus can be readily formed by, for example, drilling an axial bore through a proximal end of the fixing, extending this bore partially down the length of the shank of the fixing, and then inserting the strain sensor into this bore and fixing it at the bottom. The remaining components of the apparatus are conveniently located in a module fixed at the proximal end of the fixing.

Optionally, the module comprises a cap housing components comprising the data processing means and wireless transmitter, said cap removably attached to the proximal end of the fixing by virtue of a magnetic arrangement such that the cap and the components housed therein can be removably attached to the fixing.

Optionally, the components housed by the cap further comprise a battery.

Optionally, the magnetic arrangement comprises an adaptor ring coupled to the cap, said adaptor ring comprising one or more magnets disposed around a circumference of the adaptor ring, said one or more magnets providing, in use, a securing force between the adaptor ring and the proximal end of the fixing which detachably secures the cap and the components housed therein in place on the fixing.

Optionally, the tension monitoring apparatus further comprises a magnetic field detecting means, said magnetic field means configured to generate a magnetic field sensor signal indicative of a detected change in magnetic field in the vicinity of the tension monitoring apparatus, said data processor configured to determine if the magnetic field sensor signal corresponds to a predetermined sequence of sweeps of a magnet in a vicinity of the tension monitoring apparatus, and if so, said data processor is configured to enter a continuous data transmission mode wherein, for a predetermined period of time, the strain sensor data is continuously generated and continuously transmitted to the remote receiver.

Optionally, the module comprises a cap which houses components comprising the data processing means and wireless transmitter. The cap is removably attached to the proximal end of the fixing by virtue of a securing arrangement such that the cap and the components housed therein can be removably attached to the fixing. Optionally, in such embodiments, the module further comprises an interconnect for connecting the strain sensor and the data processing means, wherein the interconnect comprises memory having stored thereon one or more of the characterising parameters, said characterising parameters retrievable by the data processing means for use when generating the strain sensor data. Optionally, in such embodiments, the interconnect is permanently attached to the fixing and thereby separable from the cap.

Various further features and aspects of the invention are defined in the claims.

BRIEF DESCRIPTION OF THE DRAWINGS

Embodiments of the present invention will now be described by way of example only with reference to the accompanying drawings where like parts are provided with corresponding reference numerals and in which.

DETAILED DESCRIPTION

Figure 1:
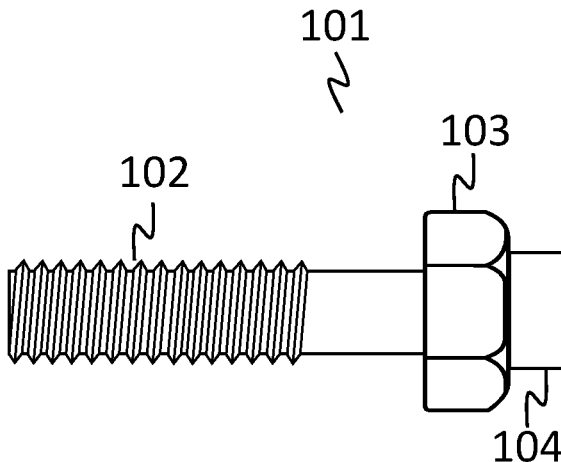
FIG. 1 provides a simplified schematic diagram of a tension monitoring device manifested as a bolt in accordance with certain embodiments of the invention.

FIG. 1 provides a simplified schematic diagram of a tension monitoring fixing arranged in accordance with certain embodiments of invention. Specifically, the tension monitoring fixing is provided by a modified bolt 101 and in particular is configured to enable tension in the bolt 101 to be monitored. Incorporated in the bolt 101 is a strain sensor, a data processor, and a wireless transceiver.

The strain sensor is configured to generate a sensor signal in response to a tension force being applied to the bolt 101. This sensor signal is communicated to the data processor. The data processor is configured to process the sensor signal and generate corresponding sensor data. The data processor controls the wireless transceiver to wirelessly transmit the sensor data to a remote receiver.

In keeping with conventional bolts, the bolt 101 comprises a threaded shank 102 and a head 103. The bolt 101 further comprises a cap 104 within which is housed certain components of the modified bolt including the data processor, the wireless transceiver, and a battery. The strain sensor is embedded within the threaded shank 102.

Figure 2:
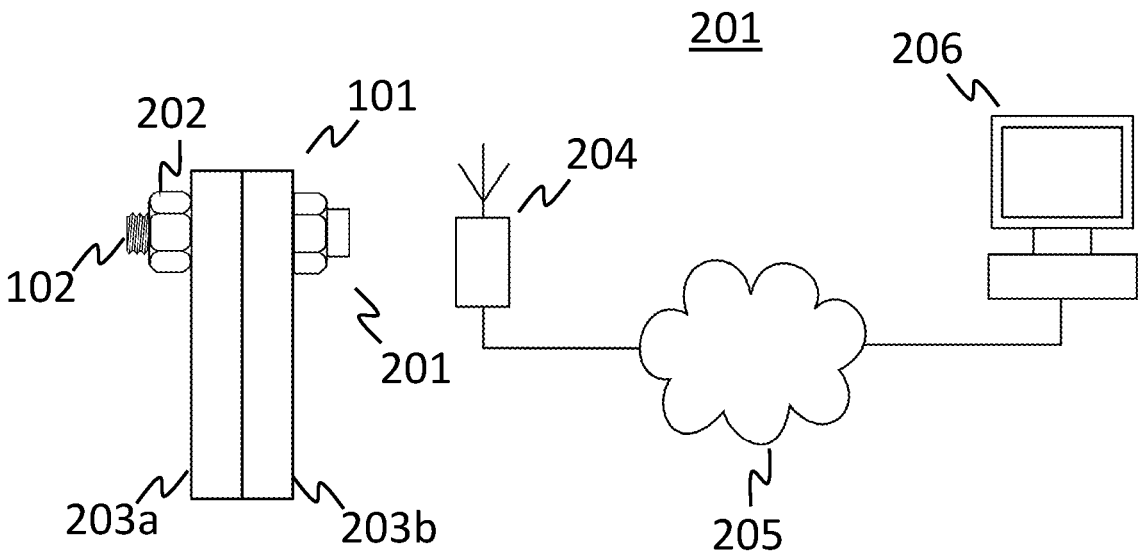
FIG. 2 provides a simplified schematic diagram of a system illustrating an example use of a tension monitoring device of the type shown in FIG. 1 in accordance with certain embodiments of the invention.

FIG. 2 provides a simplified schematic diagram showing an example use of the bolt 101, shown in FIG. 1, in a bolt monitoring system 201.

The bolt 101 is used in conjunction with a nut 202 as a fixing to secure two elements 203a, 203b together. The force urging the head 103 of the bolt 101 and the nut 202 together which secures the two elements 203a, 203b together (the securing force) gives rise to a tension force along the central axis of the shank 102. Because the strain sensor is embedded in the shank 102, this force is also exerted on the strain sensor. Changes in the securing force will give rise to corresponding changes in the tension force exerted on the strain sensor. Accordingly, the securing force securing the two elements 203a, 203b together, can be monitored by monitoring the sensor signal generated by the strain sensor.

Within the bolt, the sensor signal generated by the strain sensor is received by the data processor which generates corresponding sensor data.

This sensor data is communicated by the wireless transceiver to a remote receiver 204. The remote receiver 204 is connected via a data network 205 to a remote computing system 206 on which is running sensor data monitoring software.

The sensor data monitoring software is configured to process the sensor data received from the bolt 101 to track the tension force applied to the shank 102 of the bolt and thereby infer information about the securing force between the two elements 203a, 203b. In this way, the data monitoring software can, for example, generate a warning if it is detected that the securing force has dropped below a threshold force level indicating that the two elements 203a, 203b are no longer secured together with sufficient force, for example due to the nut becoming loose.

Figure 3:
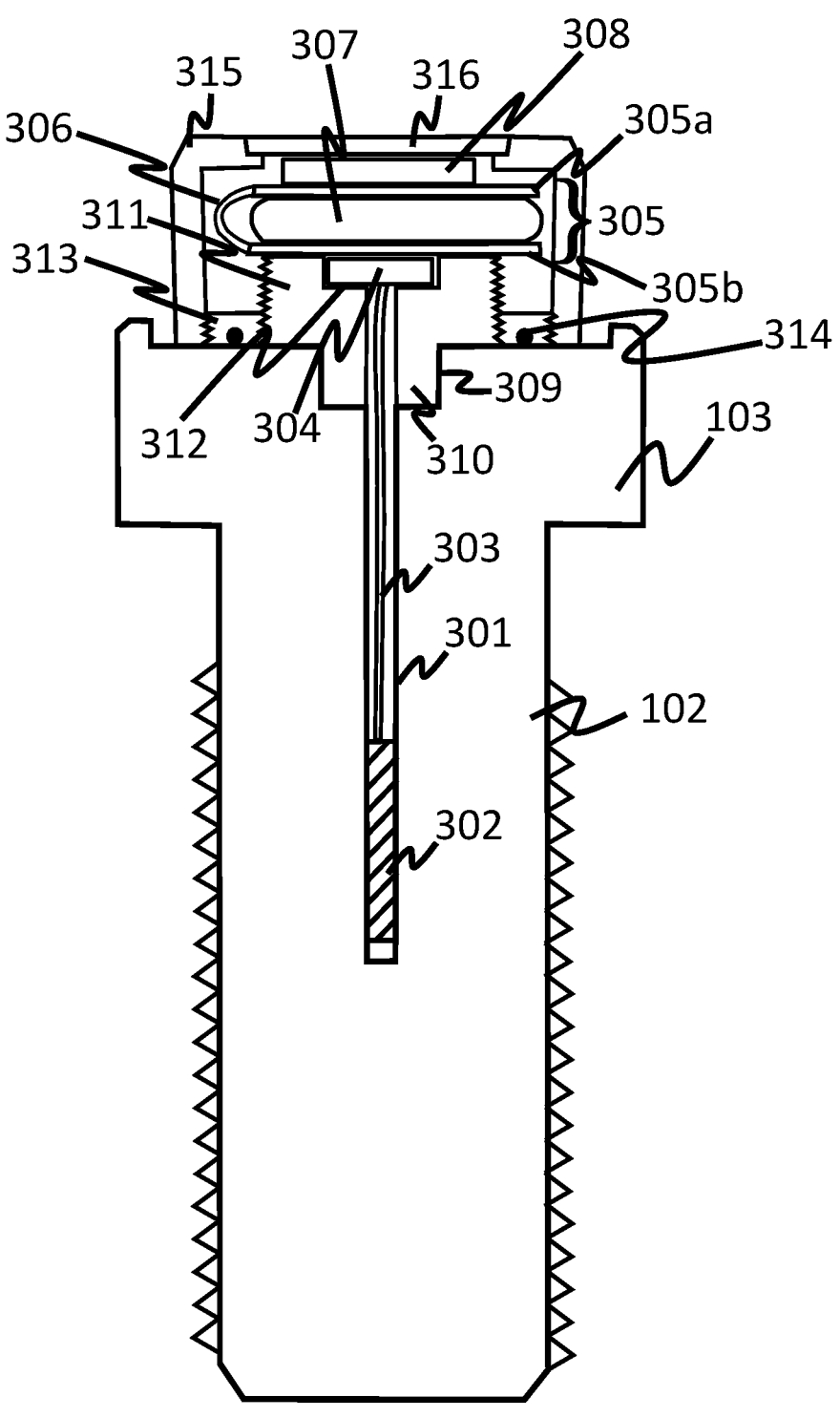
FIG. 3 provides a simplified schematic diagram showing a cross section of a tension monitoring device arranged in accordance with certain embodiments of the invention.

FIG. 3 provides a simplified schematic diagram depicting a cross sectional view of the modified bolt 101 that provides a tension monitoring fixing in accordance with certain embodiments of the invention.

A central aperture 301 extends down through the head 103 and through the threaded shank 102 generally along a central axis of the bolt 101.

The central aperture 301 terminates part way down the length of the threaded shank 102. The strain sensor 302 is located at the distal end of the central aperture 301.

A connecting lead 303 connects the strain sensor 302 to an interconnecting printed circuit board (PCB) 304.

A primary PCB 305 comprising an upper board 305a, a lower board 305b and an interconnecting lead 306 is positioned above the interconnecting PCB 304. Positioned between the upper board 305a and the lower board 305b of the primary PCB 305 is a coin cell battery 307. The primary PCB 305 has mounted thereon a data processor. Positioned above the upper board 305a of the primary PCB 305 is a wireless transceiver 308.

The head 103 of the bolt 101 includes a centrally located opening 309 which is configured to receive a correspondingly shaped protrusion 310 of a press fit insert 311. The opening 309 and the protrusion 310 are shaped and dimensioned such that upon insertion of the protrusion 310 into the opening 309, a press fit join is formed which secures the press fit insert 311 into the head 103 of the bolt 101.

The press fit insert 311 comprises an upper recess 312 into which the interconnecting PCB 304 is fitted and secured. Typically, the interconnecting PCB 304 is glued or otherwise permanently secured in place in the recess 312.

An outer perimeter of the upper part of the press fit insert 311 is provided with a screw thread. An intermediate adaptor, provided by an adaptor ring 313 with an inner thread corresponding to the thread of the press fit insert 311, is screwed onto the press fit insert 311. The adaptor ring 313 has embedded therein an O-ring 314 which when the adaptor ring 313 is fully threaded and tightened onto the press fit insert 311 engages with an upper surface of the head 103 of the bolt 101 forming a seal to prevent ingress of moisture and other unwanted material into the central aperture 301.

The adaptor ring 313 is provided with a further outer screw thread. A bolt cap 315 is provided which is configured to enclose and hold in place the primary PCB 305, the coin cell battery 307 and the wireless transceiver 308.

To secure the bolt cap 315 in place, a screw thread is provided on an inside lower peripheral portion of the bolt cap 315 for engaging with the outer screw thread of the adaptor ring 313.

When the bolt cap 315 is screwed in place, it urges the lower face of the lower board 305b against the upper face of the interconnecting PCB 304 forming a connecting interface, described in more detail below.

The bolt cap 315 comprises an upper opening which is covered by a window 316 which is made from a suitable electromagnetically transparent material which enables the wireless transceiver 308 to send and receive wireless signals when the bolt cap 315 is in place.

From FIG. 3 it can be appreciated that the modified bolt 101 can be formed from an otherwise conventional bolt with a strain sensor embedded in the shank of the bolt and with a module fitted to a proximal end of the bolt (e.g. at the head) comprising the interconnecting PCB 304, the primary PCB 305 on which is mounted the data processor, battery and wireless transceiver 308, press fit insert 311, adaptor ring 313 and bolt cap 315.

In certain examples, to form the modified bolt 101, a conventional bolt is acquired comprising, for example a head and threaded shank made from a single piece of material such as hardened steel. The central aperture 301 is then formed by drilling through the head of the bolt forming an axial bore which extends a predetermined distance down the length of the shank 102.

The centrally located opening 309 is then formed, again, typically by drilling.

The press fit insert 311 is then inserted into the centrally located opening 309. The press fit insert 311 comprises a central through hole which lines up with the axial bore thereby forming the central aperture 301.

The strain sensor 302 is then inserted into the central aperture 301, typically all the way or substantially all the way to the bottom of the central aperture 301 thereby positioning the strain sensor 302 substantially at a distal end of the central aperture 301. The strain sensor is then fixed in place, using for example a suitable hardened bonding agent so that it is rigidly connected to the shank 102 such that any strain experienced by the shank 102 will be transferred to the strain sensor 302.

The connecting lead 303 of the strain sensor 302 is then connected to the interconnecting PCB 304 which is then fixed in placed in the recess 312 of the press fit insert 311.

The strain sensor 302 can be provided by any suitable strain sensor as known in the art. Such strain sensors are typically configured such that an electrical property of a sensing element changes in response to deformation due to tension force which is then conveyed in a suitable output signal.

Advantageously, suitable strain sensors for tension monitoring fixings arranged in accordance with embodiments of the invention may have a width of approximately 2 mm. This means the width of the axial bore forming the central aperture 301 need only be slightly larger than 2 mm, for example between 2.1 mm and 2.5 mm. In contrast, techniques involving a mechanical strain gauge requiring an insertion of a rod into a threaded shank of a fixing may require an axial bore of at least 6 mm to 8 mm. A smaller width of the axial bore provides a particular advantage as it reduces the degree to which the fixing is weakened.

As described above, in use, the strain sensor 302 is configured to generate and output a sensor signal corresponding to the tension force to which the threaded shank 102 of the bolt 101 is subject.

This sensor signal is communicated via the connecting lead 303 to the interconnecting PCB 304. The interconnecting PCB 304 has mounted thereon a gain amplifier. The gain amplifier is configured to receive the sensor signal from the strain sensor and apply a predetermined gain. The interconnecting PCB 304 has further mounted thereon a memory unit on which is stored characterising parameters associated with the tension monitoring fixing provided by the modified bolt 101. These characterising parameters include identity data that identifies the tension monitoring fixing and calibration data.

The calibration data comprises data determined during a calibration process, for example when the tension monitoring fixing is first assembled or first deployed, and is used by a data processor for mapping sensor signal output values with specific sensor measurement values. In certain examples, the calibration data includes "zero-value" data indicative of the output sensor signal value corresponding to a zero-tension force.

For example, the calibration data may indicate that an output signal of 2.3V from a signal line of the sensor may correspond to a state in which no tension force is detected by the sensor.

Typically, the value of the gain applied by the gain amplifier is set during a calibration process as the tension monitoring fixing is assembled.

By virtue of an electrical connecting interface between the interconnecting PCB 304 and the lower board 305b of the primary PCB 305, the amplified sensor signal is communicated to the data processor positioned on the primary PCB 305. The electrical connecting interface also provides a means by which the calibration data and the identity data are communicated to the data processor.

The data processor is configured to process the amplified sensor signal along with the calibration data and the identity data to generate corresponding sensor data. This sensor data is then communicated from the data processor to the wireless transceiver 308 via a further electrical connecting interface between the upper board 305a of the primary PCB 305 and the wireless transceiver 308. The wireless transceiver 308 then generates and transmits a corresponding wireless signal to the remote receiver as described above. This wireless signal is a signal bearing the sensor data.

The coin cell battery 307 provides power to the primary PCB 305 via a suitable power connection formed between the upper board 305a and the lower board 305b. Power is then distributed to components mounted on the primary PCB 305 such as the data processor.

Power is distributed onwards to the wireless transceiver 308 via a suitable power connection on the upper board 305a.

Power is distributed onwards to the strain sensor 302 via a suitable power connection with the interconnecting PCB 304 and then onwards via the connecting lead 303.

As described above, the coin cell battery 307 is positioned between the upper board 305a and the lower board 305b of the primary PCB 305. This configuration provides a particular advantage. As will be appreciated, the data processor mounted on the primary PCB 305 must be connected to both the strain sensor 302 (via the interconnecting PCB 304) and the wireless transceiver 308. However, necessarily, these components are located at opposite ends of the modified bolt: the strain sensor 302 in the threaded shank 102 and the wireless transceiver 308 adjacent the window 316. By manifesting the primary PCB 305 as an upper board 305a and lower board 305b with the coin cell battery 307 located (sandwiched) between them, there is no requirement to locate the battery elsewhere which might otherwise make connecting the primary PCB 305 to one or other of the wireless transceiver 308 and strain sensor 302 more awkward and require more space. Moreover, conveniently, power can be distributed to the strain sensor 302 and wireless transceiver 308 via interconnections of the primary PCB 305.

Certain components of the tension monitoring fixing provided by the modified bolt can be removed and, if necessary, replaced. In certain embodiments, these components include the coin cell battery 307, the primary PCB 305 and the wireless transceiver 308 which are releasably held in place by the bolt cap 315.

Figure 4:
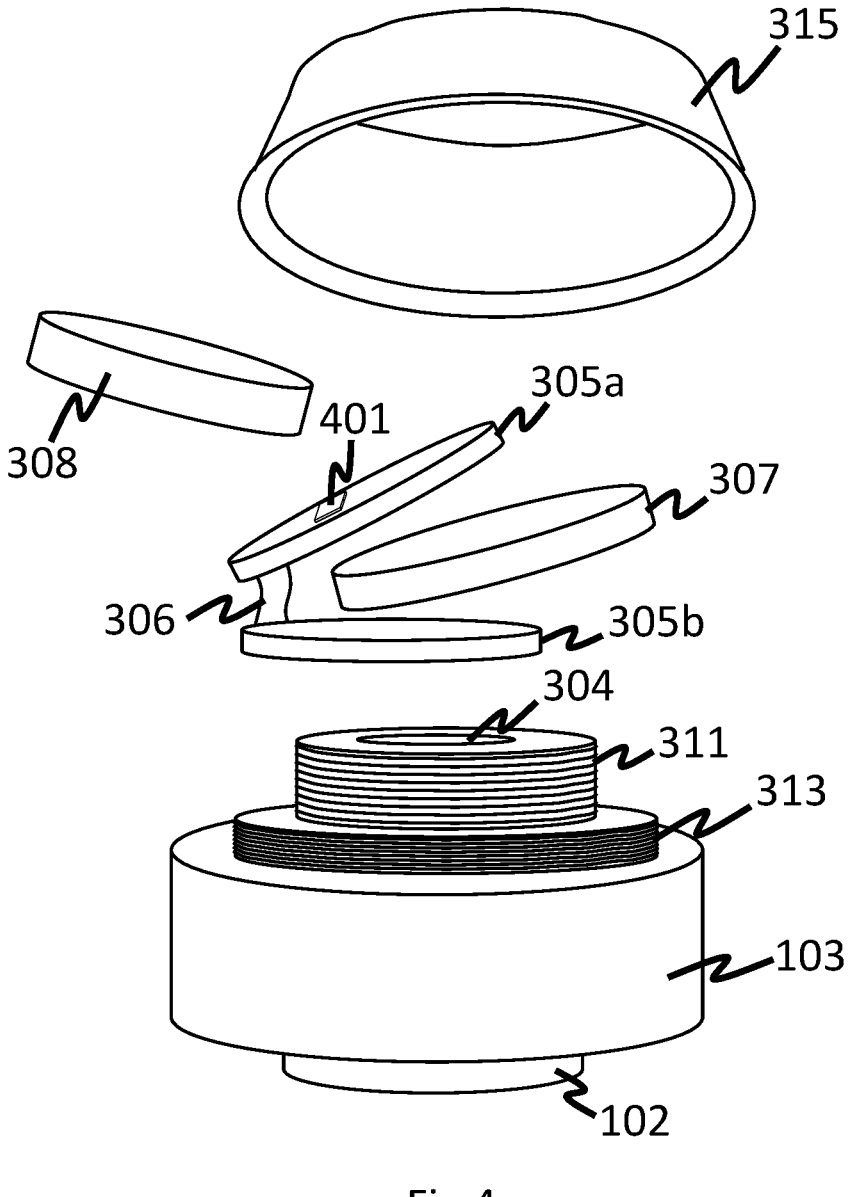
FIG. 4 provides a simplified schematic diagram depicting the removal of a cap of a tension monitoring device arranged in accordance with certain embodiments of the invention.

FIG. 4 provides a simplified schematic diagram depicting the removal of these components. As can be seen, once the bolt cap 315 is removed, the wireless transceiver 308 can be lifted off the upper board 305a of the primary PCB 305, the primary PCB 305 removed and the upper board 305a and lower board 305b separated from each other to release the coin cell battery 307.

However, as the interconnecting PCB 304 is permanently attached to the press fit insert 311, it remains permanently part of the tension monitoring fixing. In this way, irrespective of the removal and replacement of other components such as the wireless transceiver 308, primary PCB 305 and coin cell battery 307, the interconnecting PCB 304 remains in situ in the tension monitoring fixing.

Figure 5:
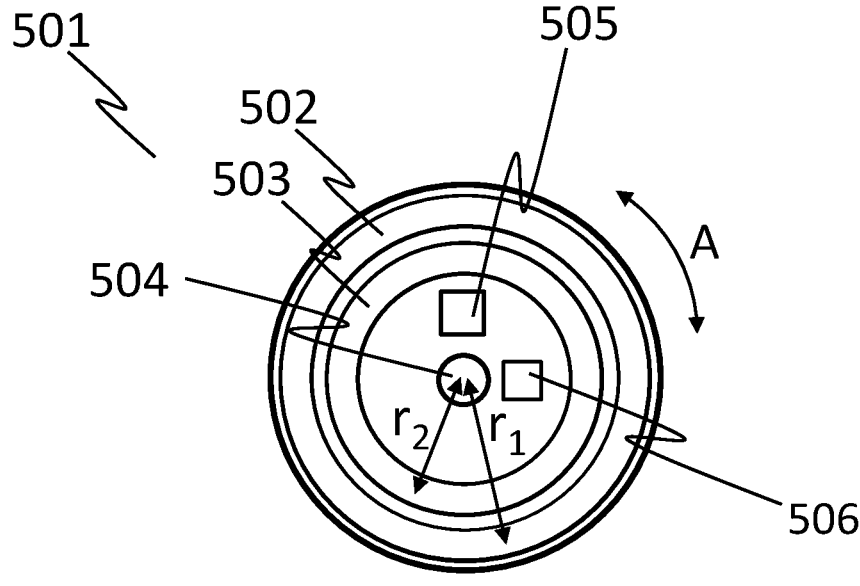
FIG. 5 provides a simplified schematic diagram showing the arrangement of an interface for connecting an interconnecting PCB and a primary PCB arranged in accordance with certain embodiments of the invention.
Figure 5:
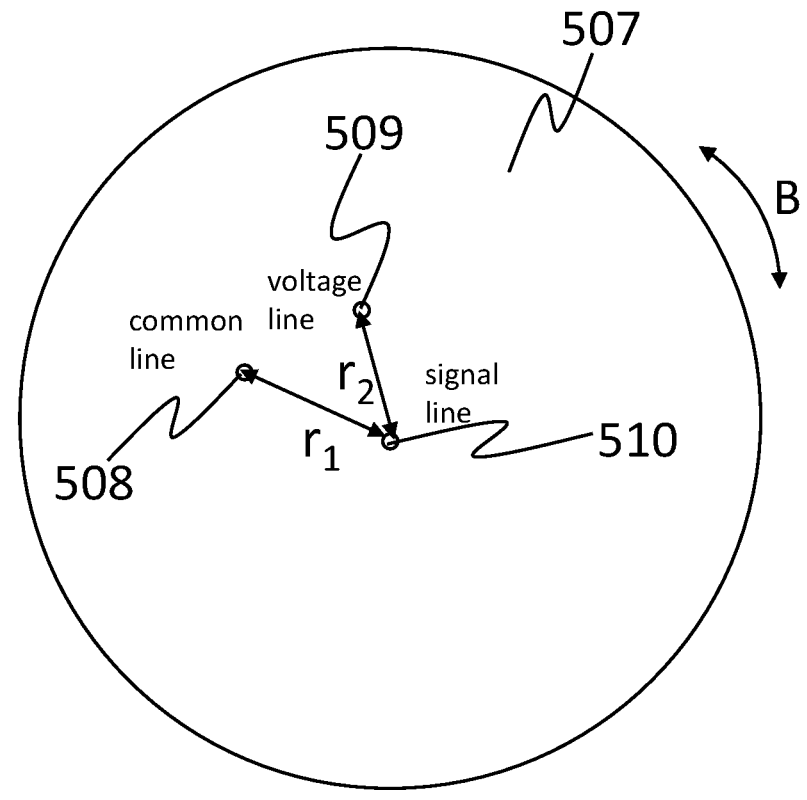

As described above, the amplified sensor signal, the calibration data and the identity data are communicated from the interconnecting PCB 304 to the data processor on the primary PCB 305 by virtue of an electrical connecting interface between the interconnecting PCB 304 and the lower board 305b of the primary PCB 305. FIG. 5 provides a simplified schematic diagram depicting the components of the interconnecting PCB 304 and the lower board 305b of the primary PCB 305 that together form this electrical connecting interface.

FIG. 4 further shows the data processor 401 mounted on the upper board 305a of the primary PCB 305.

FIG. 5 shows an upper face 501 of the interconnecting PCB 304 which in use, faces the lower board 305b of the primary PCB 305.

The upper face 501 of the interconnecting PCB 304 comprises a first connecting track 502 formed by a circular ring around the outer periphery of the upper face 501 of the interconnecting PCB 304; a second connecting track 503 formed by a circular ring around an inner periphery of the upper face 501 of the interconnecting PCB 304, and a substantially circular contact pad 504 located substantially in the centre of the upper face 501 of the interconnecting PCB 304.

The first connecting track 502, the second connecting track 503 and the contact pad 504 are made of a suitable conducting material such as a copper.

FIG. 5 further shows the memory unit 505 and the gain amplifier 506 mounted on the interconnecting PCB 304. For clarity, in FIG. 5 the intermediate connecting lines connecting these components to the first connecting track 502, the second connecting track 503 and the contact pad 504 are omitted.

FIG. 5 further shows the lower face 507 of the lower board 305b of the primary PCB 305. The lower face 507 of the lower board 305b is the face of the lower board 305b that faces the upper face 501 of the interconnecting PCB 304.

The lower face 507 of the lower board 305b of the primary PCB 305 comprises a plurality of terminal connectors (pins), specifically, a first terminal connector 508, second terminal connector 509 and third terminal connector 510.

The first terminal connector 508 is a distance $r_1$ from the centre of the lower face 507 of the lower board 305b, corresponding to a radius of the first connecting track 502.

The second terminal connector 509 is a distance r 2 from the centre of the lower face 507 of the lower board, 305b corresponding to a radius of the second connecting track 503. The third terminal connector 510 is positioned centrally on the lower face 507 of the lower board 305b.

In this way, in use, when the interconnecting PCB 304 and the lower board 305b of the primary PCB 305 are concentrically aligned, the first terminal connector 508 is positioned to engage and electrically connect with the first connecting track 502; the second terminal connector 509 is positioned to engage and electrically connect with the second connecting track 503, and the third terminal connector 510 is positioned to engage and electrically connect with the central connecting pad 504.

Further, by virtue of the fact that the first terminal connector 508 is positioned at a distance of $r_1$ from the centre of the lower face 507 of the lower board 305b which corresponds to the radius of the first connecting track 502, irrespective of the relative rotational positions of the interconnecting PCB 304 and the primary PCB 305 (that is irrespective of the degree to which the interconnecting PCB 304 and primary PCB 305 rotate in directions A and B shown in FIG. 5), the first connecting track 502 will always align with, and therefore engage and electrically connect with, the first terminal connector 508.

Similarly, by virtue of the fact that the second terminal connector 509 is positioned at a distance of $r_2$ from the centre of the lower face 507 of the lower board 305b which corresponds to the radius of the second connecting track 503, irrespective of the relative rotational positions of the interconnecting PCB 304 and the primary PCB 305, the second connecting track 503 will always align with, and therefore engage and electrically connect with, the second terminal connector 509.

The terminal connectors, the connecting tracks and the contact pad provide connection lines between the components on the primary PCB 305 (including the data processor) and the components on the interconnecting PCB 304 (including the memory and gain amplifier) and the strain sensor.

For example, in certain embodiments, the first terminal connector 508 and the first connecting track 502 provide a connection for a common line; the second terminal connector 509 and the second connecting track 503 provide a connection for a voltage line and the third terminal connector 510 and the contact pad 504 provide a connection for a signal line.

In certain embodiments the tension monitoring fixing can be provided with further monitoring functionality. In certain such examples this further monitoring functionality includes means to monitor magnetic fields, means to monitor acceleration to which the tension monitoring fixing is subject and means to measure temperature.

Figure 6:
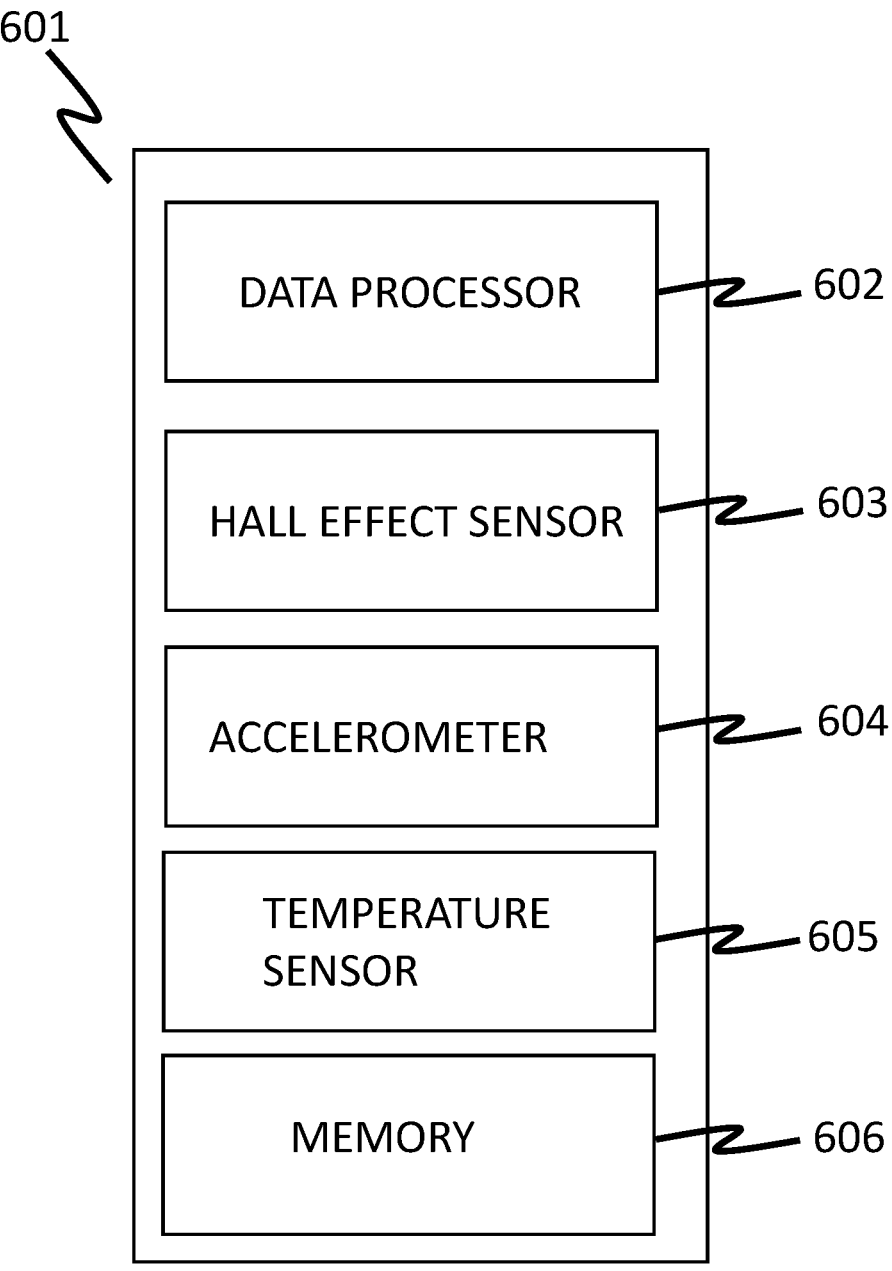
FIG. 6 provides a simplified schematic diagram depicting the components mounted on a primary PCB arranged in accordance with certain embodiments of the invention.

FIG. 6 provides a simplified schematic diagram depicting components of a primary PCB 601 of the type described above, except as well as including a data processor 602, further including a Hall effect sensor 603, an accelerometer 604, a temperature sensor 605, and a memory 606.

The Hall effect sensor 603 is connected to the data processor 602 and is configured to generate an output sensor signal which is communicated to the data processor 602 which is indicative of a detected magnetic field.

The accelerometer 604 is connected to the data processor 602 and is configured to generate an output sensor signal which is communicated to the data processor 602 and which is indicative of accelerations to which the tension monitoring fixing is subject.

The temperature sensor 605 is connected to the data processor 602 and is configured to generate an output sensor signal which is communicated to the data processor 602 and which is indicative of a detected temperature.

Typically, the data processor 602 is configured to receive the sensor signals from the sensors (the Hall effect sensor 603, the accelerometer 604, and the temperature sensor 605), convert the sensor signals into sensor data and control the wireless transceiver to communicate this sensor data to the remote computing system. In this way, useful information about magnetic fields, accelerations and temperature to which the tension monitoring fixing is subject can be remotely monitored.

In certain examples, the data processor 602 may be configured to periodically (for example at regular, predetermined, intervals such as once every 60 minutes) receive the sensor signals from the sensors and generate corresponding sensor data. In certain examples, this sensor data is stored ("logged") in the memory 606 and transmitted periodically (for example at a regular fixed frequency such as every 24 hours) to the remote computing system. In this way, reporting data can be readily generated at the remote computing system, tracking over time the sensor data generated by the sensors. Such reporting data may be useful to monitor trends over time, for example the rate at which the tension in the shank of the tension monitoring fixing reduces.

However, in certain examples it may be desirable to generate sensor data responsive to particular events. In particular, in certain examples it is useful to monitor tension in the shank of the tension monitoring fixing immediately after it has been subject to a tightening operation, for example performed by an operative using a tightening tool such as a wrench. Accordingly, in certain examples the Hall effect sensor 603 may be configured to detect changes in magnetic field arising due to a metallic tool being brought into contact with the tension monitoring fixing. The Hall effect sensor 603 is configured to generate a corresponding sensor signal which is received by the data processor 602. The data processor 602 is configured to process this signal to determine if it is associated with the change in magnetic field arising due to the presence of a tightening tool. This can be achieved in any suitable way, for example analysing the strength of the detected magnetic field and duration for which it was detected. The data processor 602 is configured to then begin receiving the sensor signal from the strain sensor and generating corresponding sensor data then storing this sensor data in the memory 606. The data processor 602 may then be configured to communicate this sensor data to the remote computing system. In this way, data relating to changes in tension of the tension monitoring fixing arising due to tightening operations can be automatically generated and then remotely monitored.

In certain embodiments, the data processor is configured to undertake further processing tasks. For example, in certain embodiments, the data processor is configured to process the sensor signal from the strain sensor to perform calculations such as determining maximum and minimum tension force values to which the shank of the tension monitoring fixing has been exposed. These calculated values can be stored in the memory for subsequent communication to the remote computing system.

In the embodiments described above, the tension monitoring fixing is described mainly with reference to a suitably modified bolt. In other words, a fixing comprising a threaded shank and a head. However, examples of the invention can be implemented in any form of suitable fixing comprising a shank which is under tension in use and configured such that the data processing and data transmission components described above can be incorporated in the fixing. Other example fixings include "studs" that comprise a fully or partially threaded shank and no head. In such examples, a strain sensor is embedded in the threaded shank of the stud and a module, of the type described with reference to FIG. 3, is fitted to a one end of the stud.

As described above, calibration data (e.g. zero datum data) and identity data (for example a unique bolt identifier) are stored on the memory located on the interconnecting PCB. In certain embodiments, further data is stored in this memory including, for example, manufacturing date data indicative of a date on which the tension monitoring fixing was manufactured and/or firmware version data.

Tension monitoring fixings in accordance with certain embodiments of the invention comprise two parts.

A first part is a modified fixing (for example a modified bolt or stud) within a shank of which is positioned a strain sensor which is connected to an interconnecting PCB of the type described above. The interconnecting PCB is permanently attached to the modified fixing. As described above, this may be by being permanently fixed to a press fit insert which itself is permanently attached to the modified fixing. A second part comprises a removable cap module which contains all the other components of the tension monitoring fixing including the primary PCB, coin cell battery, wireless transceiver and so on. This removable cap module forms a self-contained module which can be attached to, and detached from, suitable modified fixings.

In such embodiments, because the first part (the modified fixing) includes the permanently connected interconnecting PCB which has stored thereon all the characterising parameters (e.g. calibration data) unique to that modified fixing that are necessary for performing tension monitoring, the second part (the removable cap module) can be transferred between different modified fixings to undertake tension monitoring operations.

In certain settings, for example where the tension of multiple modified fixings are to be monitored, but there is no requirement to do this simultaneously, this provides a particular advantage because a single removable cap module can be transferred between several different modified fixings to generate load tension data for multiple modified fixings.

To this end, in certain embodiments, the removable cap module is adapted to facilitate ready attachment to, and detachment from, suitably modified fixings. In certain embodiments this is by virtue of a magnetic arrangement which is configured to provide a securing force between the removable module and the modified bolt which is of a sufficient strength to ensure that the removable cap module is secured in place during use, but that can be overcome (for example manually) when the removable cap module is to be removed, for example to be transferred to another modified fixing.

In certain such embodiments, this is by virtue of a magnetic intermediate adaptor ring.

Such embodiments contrast, for example, with the embodiment described with reference to FIGS. 3 and 4, in which the bolt cap is secured to the modified bolt by virtue of an intermediate adaptor ring which provides a threaded connection configured to couple the bolt cap with the modified bolt. In such embodiments it is necessary to screw the bolt cap in place.

Figure 7:
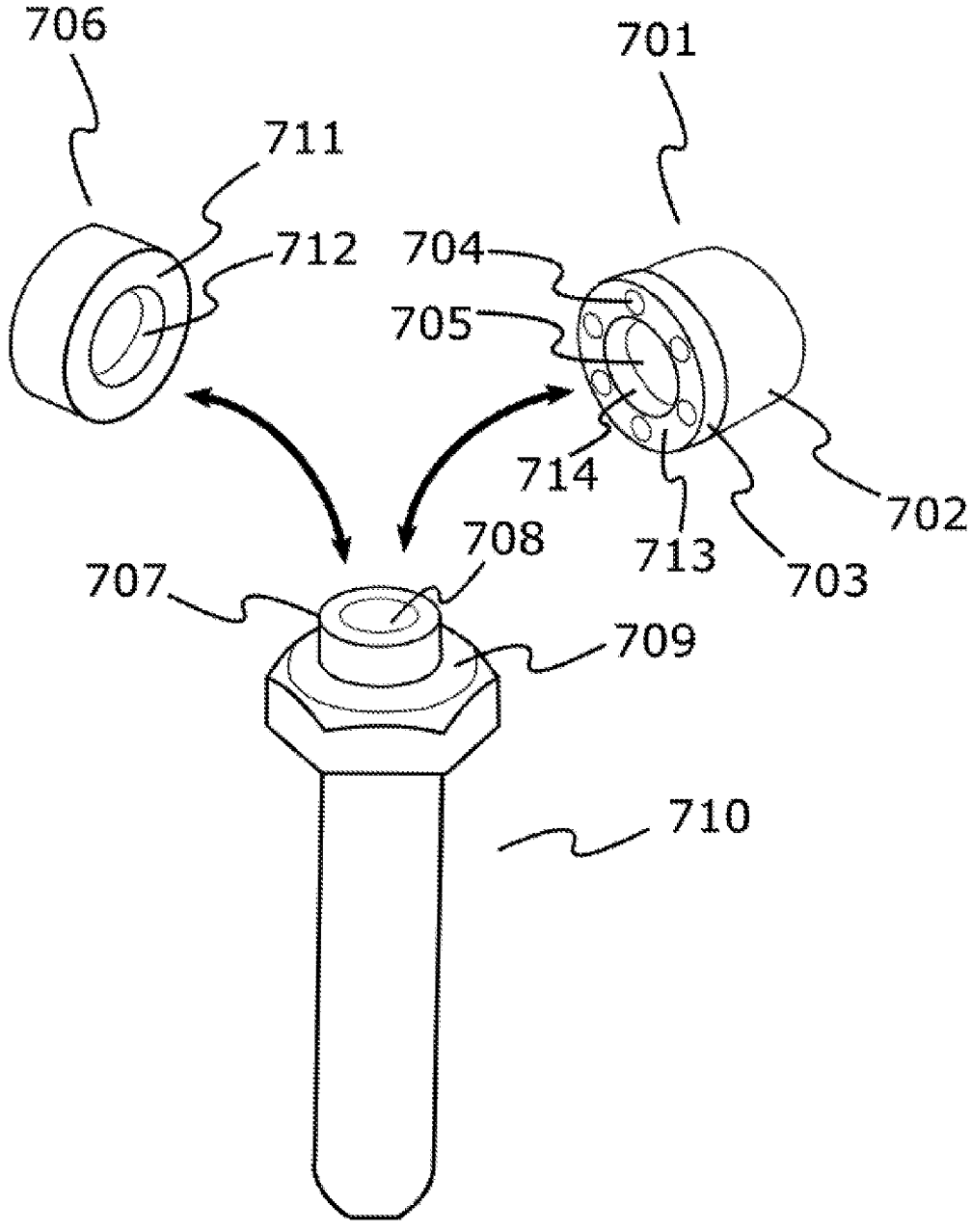
FIG. 7 provides a simplified schematic diagram showing a tension monitoring fixing in accordance with certain embodiments of the invention.

FIG. 7 provides a simplified schematic diagram depicting a tension monitoring fixing formed by a removable cap module 701 and a modified fixing, specifically a modified bolt 710. The removable cap module 701 is secured to the modified bolt 710 by virtue of a magnetic arrangement provided by a magnetic adaptor ring 703.

The adaptor ring 703 is attached to the removable module 702. The attachment between the adaptor ring 703 and the removable module 702 is provided by a press fit connection.

The adaptor ring 703 comprises a central aperture 714 and an adaptor face 713. The adaptor ring 703 further comprises a plurality of magnets 704 distributed around the circumference of the adaptor ring 703. In the example depicted in FIG. 7, the plurality of magnets comprise six magnets 704, however, any suitable number or arrangement of magnets can be used.

In use, the plurality of magnets 704 are configured to provide a securing force to secure the adaptor face 713 to a fixing face 709 of the modified bolt 710 thereby holding the removable module 702 in an attached position relative to the modified bolt 710.

In the attached position, the adaptor face 713 and the fixing face 709 engage to provide a seal to reduce ingress of moisture and other unwanted material thereby reducing the likelihood of such moisture and unwanted material coming into contact with an interconnecting PCB 708.

Further, in the attached position, the press fit insert 707 locates within the central aperture 714 of the adaptor ring 703 and the interconnecting PCB 708 engages with the lower board 705 of the primary PCB, forming an electrical connection, in accordance with that described with reference to FIG. 5.

When tension monitoring is not required, the removable module 702 can be removed from the modified bolt 710 and a dust cap 706 can be fitted to the modified bolt 710. The dust cap 706 comprises a central aperture 712 and dust cap face 711.

The central aperture 712 is shaped and dimensioned such that when the dust cap 706 is fitted to modified bolt 710, the press fit insert 707 is located within the central aperture 712 to form a friction fit joint and the dust cap face 711 engages with the fixing face 709 to provide a seal which reduces ingress of moisture and other unwanted material thereby reducing the likelihood of such moisture and unwanted material coming into contact with the interconnecting PCB 708.

Figure 8:
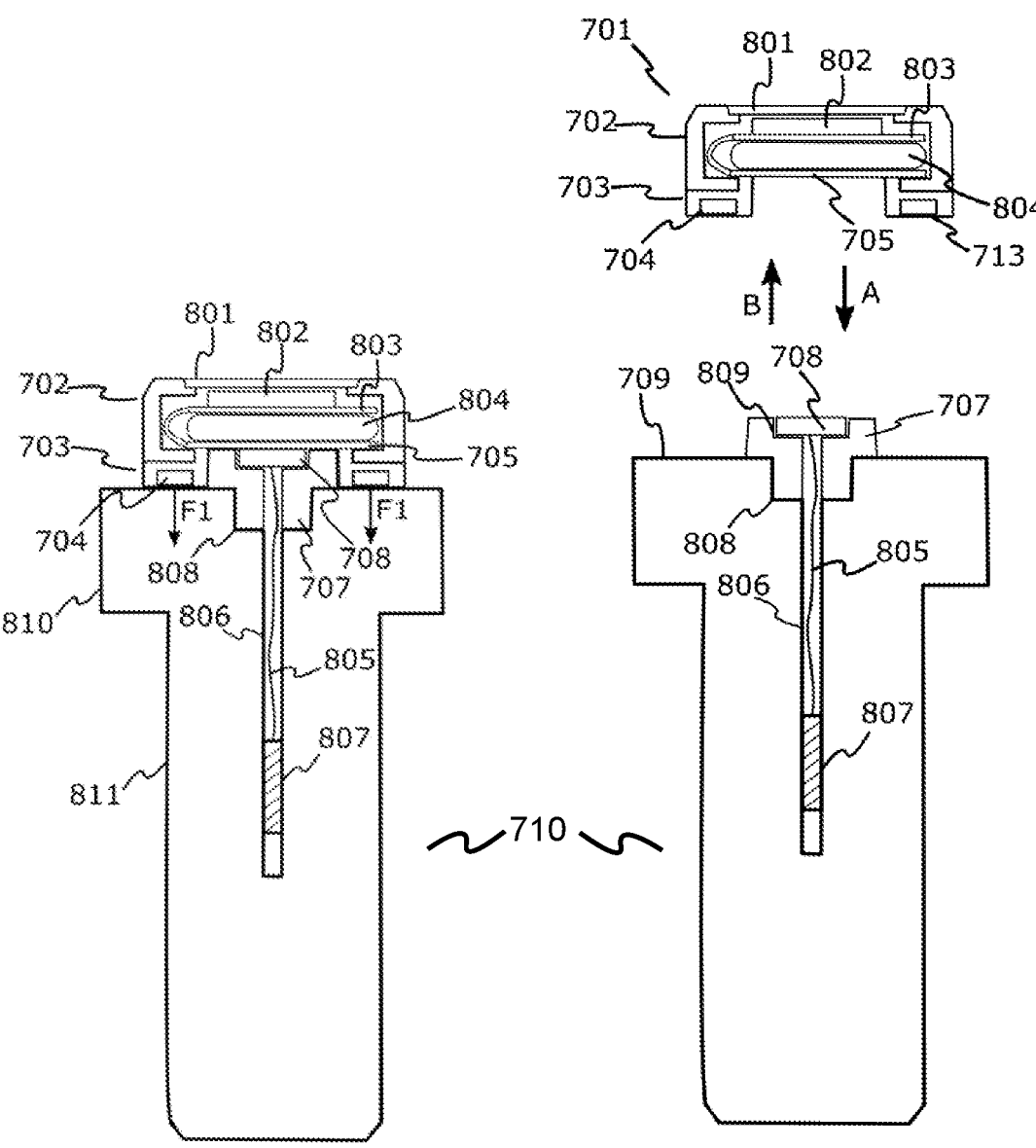
FIG. 8 provides a simplified schematic diagram showing a cross section of a tension monitoring fixing arranged in accordance with certain embodiments of the invention.

FIG. 8 provides a simplified schematic diagram showing a cross-section of the tension monitoring fixing provided by the removable cap module 701 and modified bolt 710 shown in FIG. 7.

As can be seen from FIG. 8, the removable cap module 701 comprises an electromagnetically transparent window 801, wireless transceiver 802, a primary PCB 803 and a coin cell battery 804.

The modified bolt 710 comprises a connecting lead 805 which connects a strain sensor 807, positioned in a central aperture 806 of a shank 811, to the interconnecting PCB 708. The modified bolt 710 itself comprises a centrally located opening 808 in a head 810 in which the press fit insert 707 is located. The interconnecting PCB 708 is fixed in a recess 809 of the press fit insert 707.

As can be seen from FIG. 8, the components of the tension monitoring fixing substantially correspond with above embodiments such as that described with reference to FIG. 3 with the primary exception that the removable module 702 is secured to the modified bolt 710 by virtue of the adaptor ring 703 as described with reference to FIG. 7. The adaptor ring 703 can be used to fix the removable module 702 into an attached position in which the module 702 is fixed to the modified bolt 710, as follows.

When the removable module 702 is moved in, for example, direction A, such that the magnets 704 are brought within close proximity to the fixing face 709, the magnets 704 provide a securing force F1. The securing force F1 urges adaptor face 713 against the fixing face 709 of modified bolt 710 thereby holding the removable module 702 in an attached position. In the attached position, the adaptor face 713 and the fixing face 709 engage to provide a seal to reduce ingress of moisture and other unwanted material thereby reducing the likelihood of such moisture and unwanted material coming into contact with the interconnecting PCB 708. Further, in the attached position, the press fit insert 707 is located within the central aperture 714 (shown in FIG. 7) of the adaptor ring 703 and the interconnecting PCB 708 engages with a lower board 705 of the primary PCB forming an electrically connecting interface as described in relation to FIG. 5.

From the attached position, the removable module 702 can be detached from the modified bolt 710 by pulling the removable module 702, substantially in direction B, with sufficient force to overcome the securing force F1. Typically, the securing force F1 is sufficiently low such that the removable module 702 can be removed from the modified bolt 710 without requiring specialist equipment (e.g. manually) but sufficiently high that, under typical use conditions, the removable module 702 is secured in place on the modified bolt 710 and the seal between the adaptor face 713 and the fixing face 709 is substantially maintained. In this way, the removable module 702 can be conveniently attached to, and detached from, the modified bolt 710, for example, by hand.

In contrast to the removable module, a strain sensor 807, a connecting lead 805, the press fit insert 707, and the interconnecting PCB 708 all remain, in situ, attached to the modified bolt 710. Such components are fixed to the modified bolt 710 in accordance with that described with reference to FIG. 3.

In keeping with the interconnecting PCB 304 described in reference to FIG. 3, the interconnecting PCB 708 has mounted thereon a memory unit. The memory unit has stored thereon characterising parameters associated with the modified bolt 710. The characterising parameters include identity data that identifies the tension monitoring fixing and calibration data such as that described with reference to FIG. 3. The characterising parameters can be used by the data processor of the primary PCB, for example, for mapping sensor signal output values with specific sensor measurement values.

By virtue of the above arrangement, the removable module 702 need not be attached to the modified bolt 710 until tension monitoring of the modified bolt 710 is required. Therefore, whilst tension monitoring is not required, the removable module 702 can be detached from the modified bolt 710 and the dust cap 706 (shown in FIG. 7) can be fitted to modified bolt 710 in accordance with that described with reference to FIG. 7.

As a result of detaching the removable module 702 (and therefore the coin cell battery 804), the strain sensor 807, connecting lead 805, and interconnecting PCB 708 enter a non-powered state. However, in the non-powered state, the interconnecting PCB 708 still has stored thereon characterising parameters as described above using on-board, non-volatile memory.

When tension monitoring of modified bolt 710 is again required, the dust cap 706 can then be removed from the modified bolt 710 and the removable module 702 can be attached to the modified bolt 710, by virtue of the adaptor ring 703, as described above. As the electrically connecting interface is formed between the interconnecting PCB 708 and the lower board 705 of the primary PCB by virtue of attaching the removable module 702 to the modified bolt 710, the characterising parameters stored on the interconnecting PCB 708 can, again, be used by the data processor of the primary PCB.

As described above, in certain embodiments, sensor data is generated and logged at fixed intervals (these intervals can be any suitable length depending on the application, for example every 5 minutes or every 60 minutes) and then transmitted to the remote computing system at predetermined intervals (these intervals can be any suitable length depending on the application, for example every 2 hours or 24 hours). In such embodiments, typically, when not logging sensor data or transmitting sensor data, the removable module of tension monitoring fixings arranged in accordance with embodiments of the invention are in a low-power "sleep" mode.

As described above, this sleep mode can be interrupted in response to the detection of a particular event such as the detection by a Hall effect sensor of changes in magnetic fields associated with a metallic tool being brought into contact with the tension monitoring fixing.

In further embodiments, the removable module is additionally or alternatively configured to exit the sleep mode in response to the detection of further predetermined events such as the sweeping of a magnet in the vicinity of the tension monitoring fixing.

When the sleep mode is exited in this way, in the event of the detection of a further predetermined event, for example a double-sweep of a magnet in the vicinity of the tension monitoring fixing, the removable module is configured to enter a continuous data transmission mode in which, for a predetermined period of time, sensor data providing fastener tension data is continuously generated and continuously transmitted to the remote computing device. Such embodiments may be particularly useful where it is desirable to monitor, for example, tightening or loosening operations in "real-time", that is, to monitor the tension being applied to the fixing as a fixing is being tightened or loosened.

Accordingly, an operative can, manually control the removable module to enter a continuous transmission mode by performing a predetermined sequence of sweeps of a magnet (for example one sweep to "wake" the removable module and a subsequent sweep to control the module to enter the continuous transmission mode).

Figure 9A:
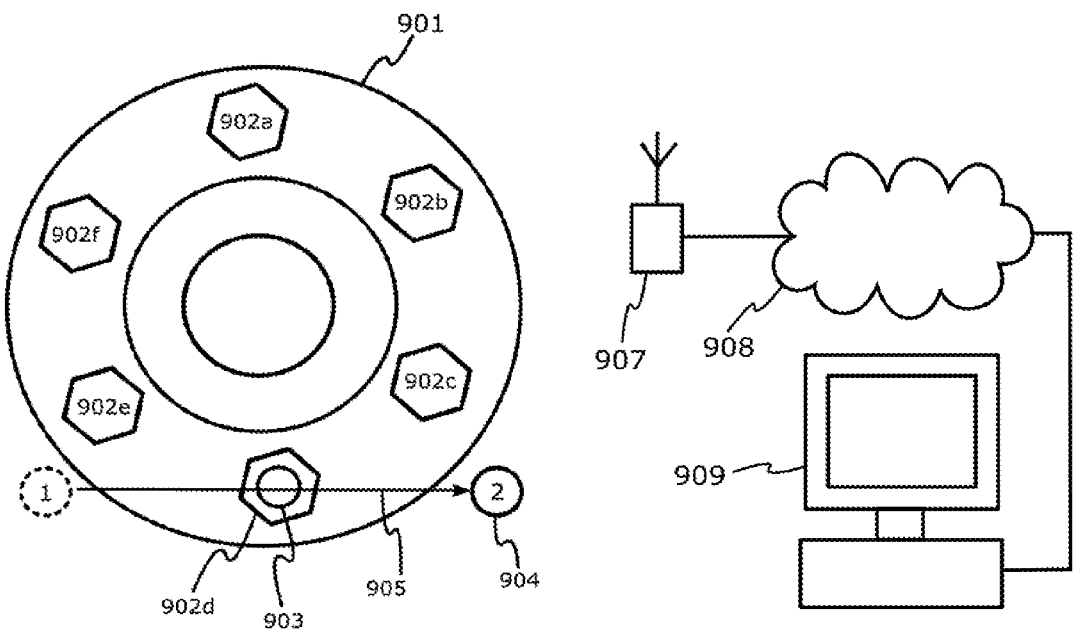
FIG. 9a provides a simplified schematic diagram showing manual activation of a tension monitoring fixing, by virtue of magnet sweep, in accordance with certain embodiments of the invention, and FIG. 9b provides a simplified schematic diagram showing manual activation of a continuous data transmission mode for a tension monitoring fixing, by virtue of magnet sweep, in accordance with certain embodiments of the invention.
Figure 9B:
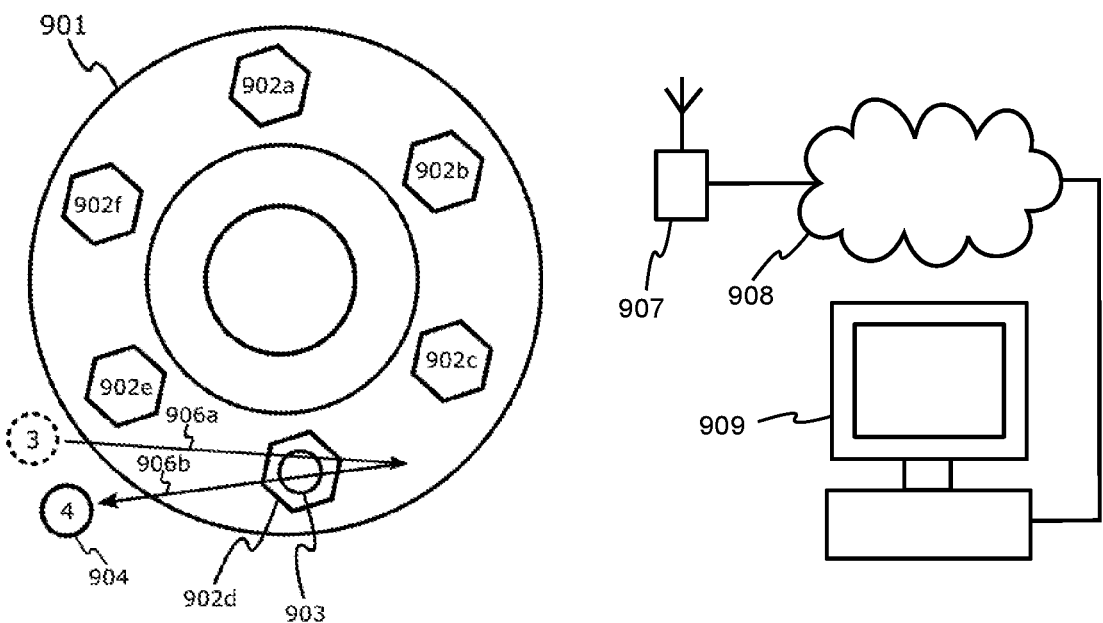

An example of such an embodiment is described further with reference to FIGS. 9a and 9b.

FIG. 9a provides a simplified schematic diagram showing manual activation of a tension monitoring fixing, by virtue of magnet sweep 905, in accordance with certain embodiments of the invention.

FIG. 9a shows a flange 901 secured to another flange (not shown) by virtue of a plurality of fixings, specifically, a plurality of bolts 902a, 902b, 902c, 902d, 902e, 902f.

One of the bolts comprises a modified bolt 902d and removable module 903 together forming a tension monitoring fixing arranged in accordance with certain embodiments of the invention. Specifically, the modified bolt 902d comprises the components described with reference to FIG. 8, including a strain sensor embedded in its shank which is connected to an interconnecting PCB on which is stored characterising parameters relating to the bolt including, for example identity data and calibration data.

Similarly, the removable module 903 comprises the components described with reference to FIG. 8, including a primary PCB including a Hall effect sensor, a battery and wireless transceiver.

Apart from periodically logging and transmitting sensor data as described above, the removable module 903 is configured to remain in a lower-power sleep mode in which the components of the removable module are maintained in a low-power state but the data processor is configured to monitor the output of the Hall effect sensor.

In the event a magnet 904 is swept from position 1 to position 2 in close proximity to the removable module 903, the Hall effect sensor is configured to detect the corresponding rapidly changing magnetic field and generate a corresponding sensor signal which is communicated to the data processor. The data processor is then configured to process this sensor signal to determine if the sensor signal corresponds with a predetermined wake-up event (i.e. the sensor signal is indicative of a magnetic sweep).

If the data processor determines that the sensor signal received from the Hall effect sensor does indeed correspond to the predetermined wake-up event, if, in the same way, a further predetermined event is detected, specifically a double-sweep of the magnet 904 in which the magnet 904 is swept from position 3, via paths 906a and 906b (i.e. a double pass), to position 4, in close proximity to the removable module 903, as shown in FIG. 9b, then the data processor is configured to control the removable module 903 to enter a continuous data transmission mode.

In this continuous data transmission mode, the data processor is configured to continuously receive the strain sensor signal from the strain sensor, continuously generate corresponding strain sensor data and continuously stream strain sensor data, from the wireless transceiver, to a remote user device 909, via a remote transceiver 907 and data network 908.

Removable modules arranged in accordance with further embodiments can be controlled to enter a continuous transmission mode by alternative means. For example, with reference to FIGS. 9a and 9b, by virtue of a control signal generated at, and communicated from, the user device 909 and which is communicated via the data network 908 and the remote transceiver 907, to the wireless transceiver of the removable module 903. In response to the receipt of such a control signal, in such embodiments, the data processor is configured to control the removable module 903 to enter a continuous data transmission mode as described above.

In this way, even in an environment in which physical access to the tension monitoring fixings is limited, an operative can selectively activate tension monitoring fixings and further activate continuous tension monitoring of such fixings via a suitable wireless connection.

As described above, strain sensors for use in tension monitoring fixings in accordance with embodiments of the invention can be provided by any suitable strain sensor as known in the art. As described above, such strain sensors comprise a sensing element (known in the art as a strain gauge) an electrical property of which changes in response to deformation due to tension force which is then conveyed in a suitable output signal.

All of the features disclosed in this specification (including any accompanying claims, abstract and drawings), and/ or all of the steps of any method or process so disclosed, may be combined in any combination, except combinations where at least some of such features and/or steps are mutually exclusive. Each feature disclosed in this specification (including any accompanying claims, abstract and drawings) may be replaced by alternative features serving the same, equivalent, or similar purpose, unless expressly stated otherwise. Thus, unless expressly stated otherwise, each feature disclosed is one example only of a generic series of equivalent or similar features. The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

It will be appreciated that various embodiments of the present disclosure have been described herein for purposes of illustration, and that various modifications may be made without departing from the scope of the present disclosure. Accordingly, the various embodiments disclosed herein are not intended to be limiting, with the true scope being indicated by the following claims.

The invention claimed is:

1. Tension monitoring apparatus comprising:
a fixing with a shank which in use is under tension;
a strain sensor embedded in the shank of the fixing and configured to generate a strain sensor signal corresponding to tension in the shank;
data processing means configured to receive the strain sensor signal, process the strain sensor signal in accordance with one or more characterizing parameters associated with the strain sensor and thereby generate corresponding strain sensor data indicative of a strain to which the shank is subject, and
a wireless transmitter for communicating the strain sensor data to a remote receiver, wherein:
the data processing means and the wireless transmitter are mounted in a module fixed to an end of the fixing;
the module further comprises an interconnect for connecting the strain sensor and the data processing means; and
the interconnect comprises memory having stored thereon one or more of the characterizing parameters, said characterizing parameters retrievable by the data processing means for use when generating the strain sensor data.

2. Tension monitoring apparatus according to claim 1, wherein the shank is a threaded shank.

3. Tension monitoring apparatus according to claim 2, wherein the fixing is a bolt said bolt comprising a bolt head located at an end of the threaded shank.

4. Tension monitoring apparatus according to claim 3, wherein the module is incorporated in the head of the bolt.

5. Tension monitoring apparatus according to claim 1, wherein the module comprises a press fit insert fixed in a corresponding insert receiving aperture at the proximal end of the fixing, said module comprising a cap enclosing the data processing means and wireless transmitter, said cap removably attached to the press fit insert.

6. Tension monitoring apparatus according to claim 5, wherein the cap is removably attached to the press fit insert by virtue of an intermediate adaptor secured to the press fit insert, said intermediate adaptor comprising an outer threaded face configured to engage with a corresponding inner threaded face of the cap.

7. Tension monitoring apparatus according to claim 6, wherein the interconnect is fixed to the press fit insert.

8. Tension monitoring apparatus according to claim 7, comprising a plurality of components that are detachable from the module by removing the cap, said plurality of components comprising the data processing means and the wireless transmitter.

9. Tension monitoring apparatus according to claim 7, wherein the plurality of components that are detachable from the module further comprise a battery.

10. Tension monitoring apparatus according to claim 9, wherein the interconnect is provided on a first circuit board arrangement and the data processing means is located on a second circuit board arrangement.

11. Tension monitoring apparatus according to claim 10, wherein the second circuit board arrangement comprises an upper board and a lower board and the battery is enclosed between the upper board and the lower board.

12. Tension monitoring apparatus according to claim 1, wherein the interconnect and the data processing means are connectable via an interface, said interface comprising a first interface part and a second interface part, wherein said first interface part comprises a plurality of pins and said second interface part comprises a plurality of substantially circular conducting tracks, wherein the plurality of pins are positioned on the first interface part such that when the first interface part and second interface part are concentrically aligned, each pin contacts one of the circular conducting tracks irrespective a rotational alignment of the first interface part and second interface part.

13. Tension monitoring apparatus according to claim 1, wherein the characterizing parameters comprise calibration data determined during a calibration process performed on the sensor and for mapping strain sensor signal output values with sensor measurement values.

14. Tension monitoring apparatus according to claim 13, wherein the calibration data is data indicative of a strain sensor signal value corresponding to a zero-measurement value.

15. Tension monitoring apparatus according to claim 1, wherein the characterizing parameters comprise identity data identifying the tension monitoring apparatus and for including in the strain sensor data transmittable to the remote receiver.

16. Tension monitoring apparatus according to claim 1, wherein the interconnect comprises a gain amplifier for applying a predetermined gain to the strain sensor signal before it is received by the data processing means.

17. Tension monitoring apparatus according to claim 1, wherein the strain sensor is located at a distal end of an axial bore extending part way down a length of the shank of the fixing.

18. Tension monitoring apparatus according to claim 1, further comprising temperature sensing means, said temperature sensing means configured to generate a temperature sensor signal indicative of a detected temperature, said data processing means configured to receive the temperature sensor signal, process the temperature sensor signal and generate corresponding temperature sensor data, said wireless transmitter configured to communicate the temperature sensor data to the remote receiver.

19. Tension monitoring apparatus according to claim 1, further comprising acceleration detecting means, said acceleration detecting means configured to generate an acceleration sensor signal indicative of a detected acceleration to which the apparatus is subject, said data processing means configured to receive the acceleration sensor signal, process the acceleration sensor signal and generate corresponding acceleration sensor data, said wireless transmitter configured to communicate the acceleration sensor data to the remote receiver.

20. Tension monitoring apparatus according to claim 1, further comprising magnetic field detecting means, said magnetic field detecting means configured to generate a magnetic field sensor signal indicative of a detected change in magnetic field, said data processing means configured to receive the magnetic field sensor signal, process the magnetic field sensor signal and if the magnetic field sensor signal is indicative of a tightening tool being applied to the fixing, said data processing means is configured to activate the strain sensor, receive the strain sensor signal and generate strain sensor data for communicating to the remote receiver.

21. Tension monitoring apparatus according to claim 1, wherein the data processing means is configured to determine from the strain sensor signal a maximum and minimum detected tension in the shank, and store corresponding maximum and minimum detected tension values in a memory for subsequent communication to the remote receiver.

22. A tension monitoring system comprising a tension monitoring apparatus according to claim 1, further comprising the remote receiver and a remote computing system on which is running sensor data monitoring software, wherein said tension monitoring apparatus is configured to communicate the strain sensor data to the remote computing system, via the remote receiver, for processing by the sensor data monitoring software.

23. Tension monitoring apparatus according to claim 1, wherein the module comprises a cap which houses components comprising the data processing means and wireless transmitter, said cap removably attached to a proximal end of the fixing by virtue of a magnetic arrangement such that the cap and the components housed therein are removably attached to the fixing.

24. Tension monitoring apparatus according to claim 23, wherein the components housed by the cap further comprise a battery.

25. Tension monitoring apparatus according to claim 23, wherein the magnetic arrangement comprises an adaptor ring coupled to the cap, said adaptor ring comprising one or more magnets disposed around a circumference of the adaptor ring, said one or more magnets providing, in use, a securing force between the adaptor ring and the proximal end of the fixing which detachably secures the cap and the components housed therein in place on the fixing.

26. Tension monitoring apparatus according to claim 1, further comprising magnetic field detecting means, said magnetic field detecting means configured to generate a magnetic field sensor signal indicative of a detected change in magnetic field in the vicinity of the tension monitoring apparatus, the data processor configured to determine if the magnetic field sensor signal corresponds to a predetermined sequence of sweeps of a magnet in a vicinity of the tension monitoring apparatus, and if so, said data processor is configured to enter a continuous data transmission mode wherein, for a predetermined period of time, the strain sensor data is continuously generated and continuously transmitted to the remote receiver.

\* \* \* \* \*